(12) United States Patent
Stacey

(10) Patent No.: US 8,474,372 B2
(45) Date of Patent: Jul. 2, 2013

(54) EGG PAN

(76) Inventor: Edwin J. Stacey, Newport Beach, CA (US)

( * ) Notice: Subject to any disclaimer, the term of this patent is extended or adjusted under 35 U.S.C. 154(b) by 0 days.

(21) Appl. No.: 13/367,075

(22) Filed: Feb. 6, 2012

(65) Prior Publication Data

US 2012/0210884 A1     Aug. 23, 2012

Related U.S. Application Data

(60) Provisional application No. 61/444,262, filed on Feb. 18, 2011.

(51) Int. Cl.
*A47J 37/10*     (2006.01)
(52) U.S. Cl.
USPC ................................. 99/422; 99/425; D7/357
(58) Field of Classification Search
USPC .................. 99/345–347, 380, 339, 422, 440, 99/425; 220/4, 20, 22, 23.83; 126/381, 382; D7/257
See application file for complete search history.

(56) References Cited

U.S. PATENT DOCUMENTS 1,469,318 A * 10/1923 Hill ............................. 222/145.1
3,704,663 A * 12/1972 Shull et al. ....................... 99/347

* cited by examiner

*Primary Examiner* — Jianying Atkisson
(74) *Attorney, Agent, or Firm* — Vladi Khiterer

(57) ABSTRACT

An egg pan has individual egg bowls and a water reservoir having channels surrounding the egg bowls. Water is introduced into the water reservoir during the final stage of cooking eggs. A user would cook eggs inside the egg bowls to desired consistency and then pour a small amount of water into the water reservoir and close a snugly-fitting lid, thus generating steam. Exposure to steam at the final stage of cooking causes improvement in shape and appearance of the cooked eggs.

1 Claim, 4 Drawing Sheets

EGG PAN

REFERENCE TO PRIOR PROVISIONAL APPLICATION (35 U.S.C. 119(e))

This application claims the benefit of the U.S. Provisional Application No. 61/444,262 filed on Feb. 18, 2011, Confirmation No. 2561.

BACKGROUND OF THE INVENTION

This invention relates to cookware, and more particularly to an egg pan having individual egg bowls and a built in water reservoir adjacent to the egg bowls. The prior art is replete with egg pans and egg poachers having individual egg bowls or egg cups. Some of them comprise numerous removable parts, making it cumbersome to use and difficult to clean. Others, while comprising one-piece pans with egg cups embedded into them, do not differ substantially from flat bottom egg pans in cooking performance.

What is need is an egg pan that is not only simple and easy to clean, but also allows a user without extraordinary cooking skills to cook perfect eggs every time.

SUMMARY OF THE INVENTION

The egg pan of this invention satisfies this need. The egg pan according to this invention has individual egg bowls and a water reservoir having channels surrounding the egg bowls. Water is introduced into the reservoir during the final stage of cooking eggs. Specifically, a user would cook eggs inside the egg bowls to desired consistency and then pour a small amount of water into the water reservoir and close a snugly-fitting lid. After approximately seven seconds, the water will turn into steam and cause the eggs to be perfect in shape and appearance, without getting soggy.

DESCRIPTION OF THE INVENTION

Figure 1:
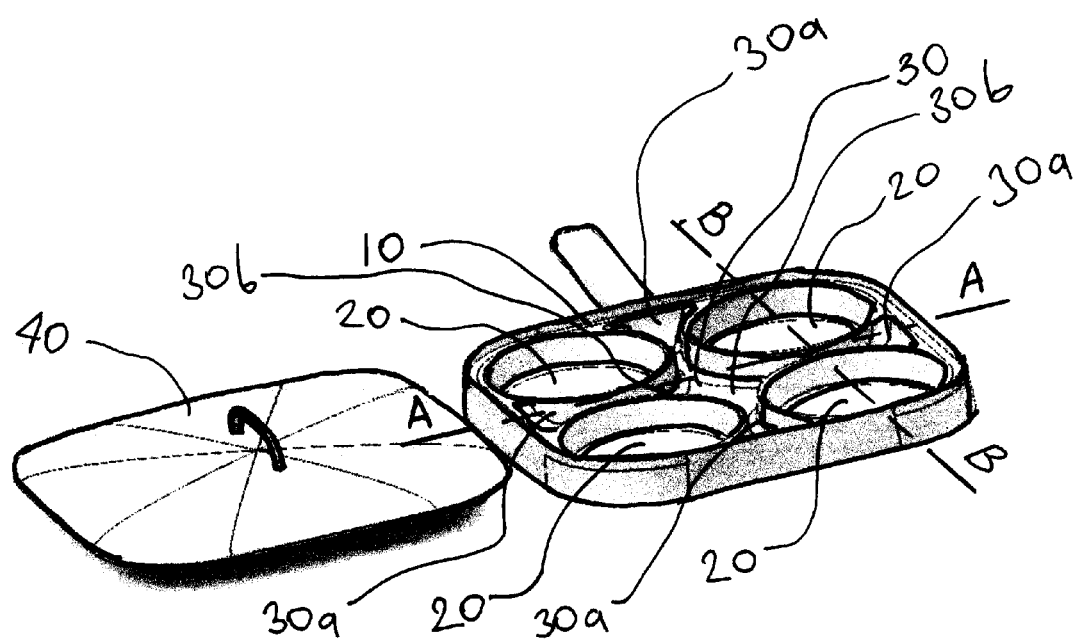
FIG. 1 is a perspective view of the egg pan according to this invention.
Figure 2:
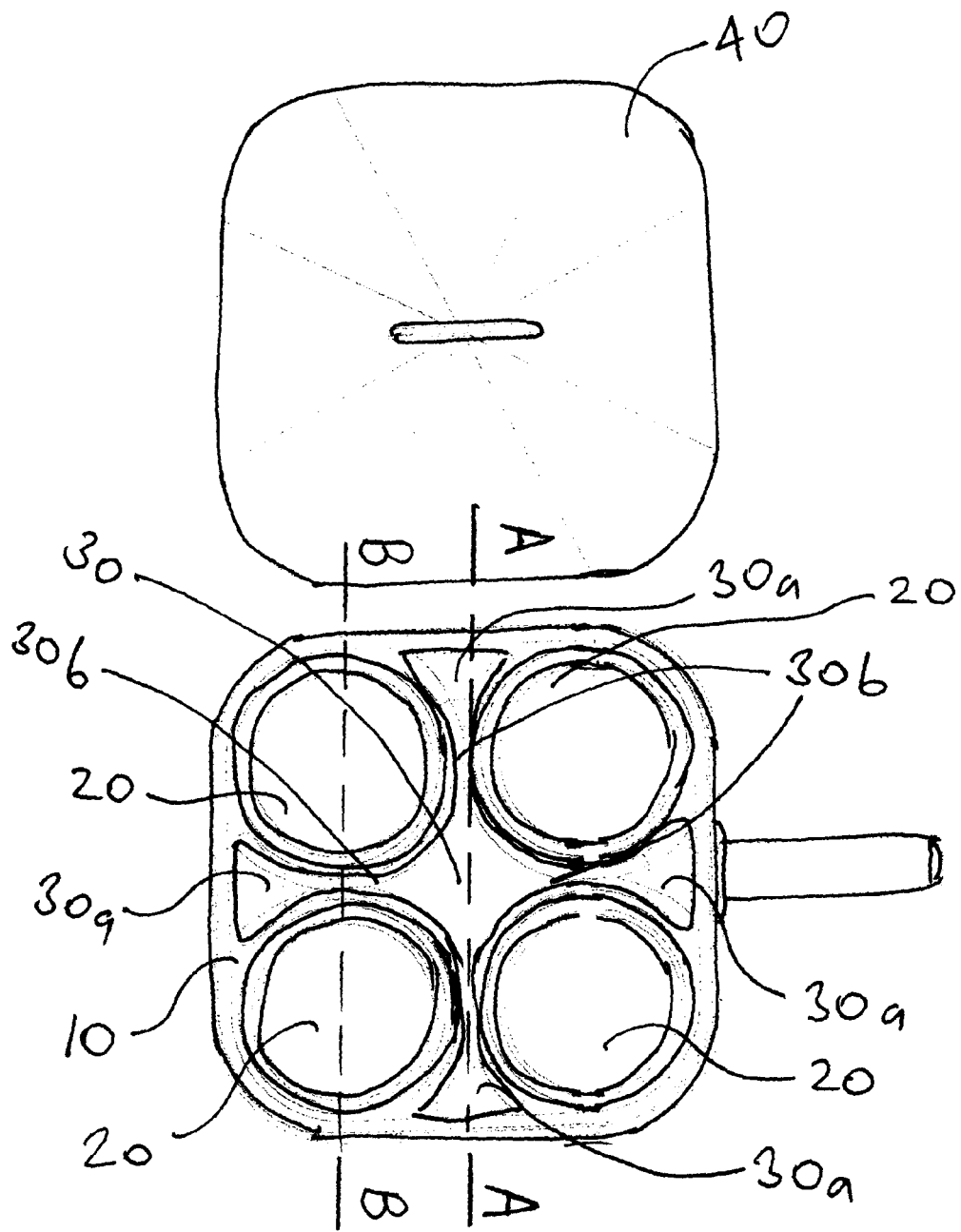
FIG. 2 is a top plan view of the egg pan according to this invention.
Figure 3:
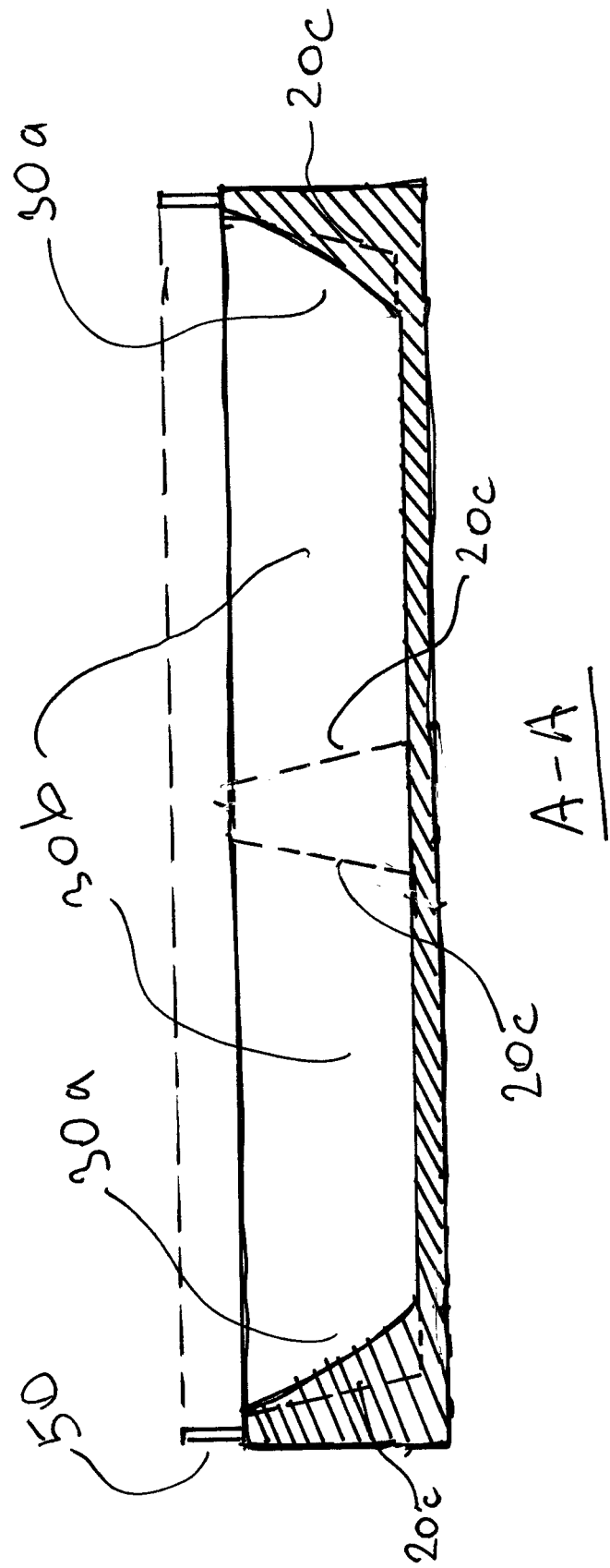
FIG. 3 is a cross sectional view of the egg pan according to this invention, cut through the reservoir.
Figure 4:
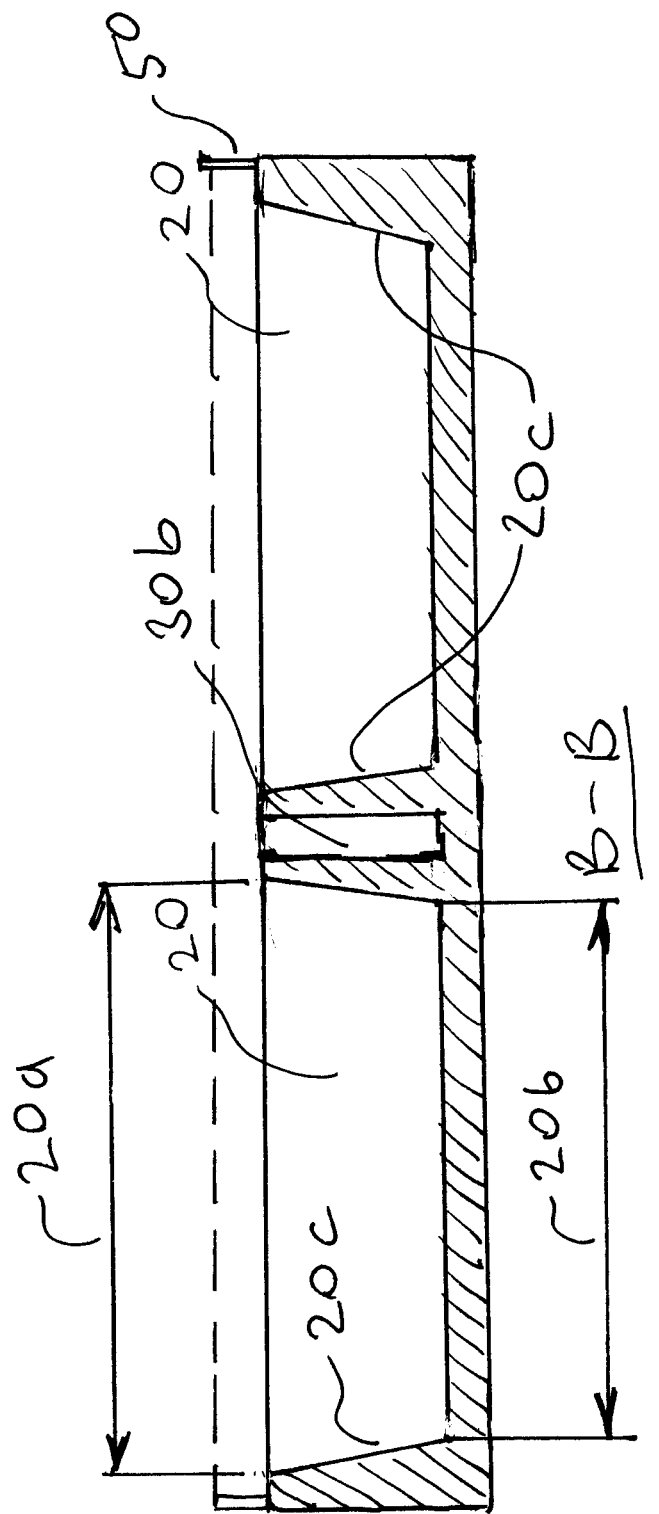
FIG. 4 is a cross sectional view of the egg pan according to this invention, cut through the egg bowls.

The preferred embodiment of this invention will be better understood in reference to FIG. 1 trough FIG. 4. The same numerals refer to the same elements in all FIG. 1 through FIG. 4.

Viewing now, simultaneously, FIG. 1 through FIG. 4, numeral 10 indicates a planar top. Numeral 20 indicates an egg bowl. A plurality of egg bowls 20 extends below planar top 10. In the preferred embodiment described in reference to FIG. 1 through FIG. 4, a total of four egg bowls 20 are shown, even though a different number of egg bowls 20 may be used. Each egg bowl 20 has a closed end, a generally frustoconical wall with an open end having a larger diameter that the closed end. The open end is joined to planar top 10. Numeral 30 indicates a reservoir. Reservoir 30 extends below planar top 10. Reservoir 30 is disposed substantially adjacent to egg bowls 20 and has a closed distal end and an open proximal end. The open proximal end is joined to planar top 10. Numeral 40 indicates a lid. Lid 40 substantially encloses planar top 10.

In the preferred embodiment described in reference to FIG. 1 through FIG. 4, planar top 10, egg bowls 20 and the reservoir 30 are shown as a single integrated unit. Such single integrated unit is formed of stamped aluminum or aluminum alloy and non-stick coated. In other embodiments, the egg pan of this invention may be fabricated out of cast iron, steel, copper or other appropriate material. It is desirable for the metal thickness to be at least 3/16" for better heat distribution.

Numeral 30a indicates an inlet, which is a part of reservoir 30. A plurality of inlets 30a is disposed along an outer edge of planar top 30. A total of four inlets 30a are shown in the preferred embodiment described in reference to FIG. 1 through FIG. 4. Each inlet 30a is positioned substantially equadistally between the open ends of egg bowls 20.

Numeral 30b indicates a channel, which is also a part of reservoir 30. A total of two channels 30b are shown in the preferred embodiment described in reference to FIG. 1 through FIG. 4. Each channel 30b connects two inlets 30a positioned on opposite sides of planar top 10. All channels 30b and all inlets 30a are in fluid communication with one another, such that pouring water into any inlet 30a will distribute water into all channels 30b.

Viewing now specifically FIG. 3, inlets 30a are shown with their bottom surfaces sloped away from the outer edge of planar top 10 until joining bottom surfaces of channels 30b. It is desirable for bottom surfaces of inlets 30a to join bottom surfaces of channels 30b approximately 1" from the outer edge of planar top 10.

Numeral 50 indicates a lip. Lip 50 extends upwardly from planar top 10 along the outer edge, receiving lid 40. Lid 40 must fit snugly over lip 50. It is desirable for lip 50 to be approximately 3/8".

Viewing now specifically FIG. 4, numeral 20a indicates the diameter of the open end of egg bowl 20. Numeral 20b indicates the diameter of the closed end of egg bowl 20. Diameter 20a is larger than diameter 20b. Numeral 20c indicates a generally frustoconical wall of egg bowl 20.

In order to achieve a perfect shape for the cooked eggs, egg bowls 20 should have depth of approximately 3/4", diameter 20a of approximately 4½" and diameter 20b of approximately 4". There should be approximately ¼" set off from the outer edge to wall 20c all around planar top 10.

Reservoir 30 is used for introducing water during the final stage of cooking eggs with the egg pan according to this invention. Specifically, a user would cook eggs inside egg bowls 20 to desired consistency and then pour a small amount of water into reservoir 30 and close lid 40. After approximately seven seconds, the water will turn into steam and cause the eggs to be perfect in shape and appearance.

While the present invention has been described and defined by reference to the preferred embodiment of the invention, such reference does not imply a limitation on the invention, and no such limitation is to be inferred. The invention is capable of considerable modification, alteration, and equivalents in form and function, as will occur to those ordinarily skilled and knowledgeable in the pertinent arts, including a free standing electrical appliance incorporating this invention. The depicted and described preferred embodiment of the invention is exemplary only, and is not exhaustive of the scope of the invention. Consequently, the invention is intended to be limited only by the spirit and scope of the appended claims, giving full cognizance to equivalents in all respects.

I claim:

1. An egg pan comprising:
a planar top;
a plurality of circular egg bowls extending below the planar top, each having a closed end, a generally frustoconical wall with an open end having a larger diameter than the closed end, the open end joined to the planar top;
a reservoir for introducing water, the reservoir extending below the planar top, disposed substantially adjacent to the egg bowls and having a closed distal end and an open proximal end joined to the planar top;
a lid substantially enclosing the planar top;
wherein the planar top, the plurality of circular and the reservoir form a single integrated unit; wherein the reservoir comprises:
a plurality of substantially identically sized and shaped inlets disposed along an outer edge of the planar top, each inlet positioned substantially equadistally between two adjacent open ends of the plurality of circular egg bowls of the egg bowls;
a plurality of substantially identically sized and shaped channels, each of the channels connecting two of the plurality of inlets positioned on opposite sides of the planar top, such that all channels and all inlets are in fluid communication with one another;
each of the plurality of inlets having bottom surface sloped away from the outer edge of the planar pan until joining a bottom surface of one of the plurality of channels;
wherein the egg pan comprising a lip extending upwardly from the planar top along the outer edge, receiving the lid.

* * * * *